United States Patent Office 3,652,635
Patented Mar. 28, 1972

3,652,635
STABILIZED α-CYANOACRYLATE ADHESIVE COMPOSITIONS
Sukeyoshi Kawamura, Kishichiro Kondo, Kenji Ito, Hiroshi Suzuki, and Eizo Yasui, Minato-ku, and Toshiro Kobayashi, Takaoka-shi, Japan, assignors to Toagosei Chemical Industry Co., Ltd., Tokyo, Japan
No Drawing. Filed July 28, 1969, Ser. No. 845,528
Claims priority, application Japan, Aug. 9, 1968, 43/56,118; Jan. 16, 1969, 44/2,617
Int. Cl. C07c 121/00, 121/40, 121/60
U.S. Cl. 260—464   7 Claims

ABSTRACT OF THE DISCLOSURE

An adhesive composition containing an aromatic sulfonic acid as a stabilizer. This composition can be increased in tackiness, without causing length, by addition of an acrylate ester-acrylonitrile copolymer.

BACKGROUND OF THE INVENTION (1) Field of the invention

This invention relates to stable adhesive compositions. More particularly, the invention pertains to stable α-cyanoacrylate adhesive compositions which, at the time of application as adhesives, are polymerizable within quite a short period of time but, at the time of storage, are inhibited from polymerization.

(2) Description of the prior art

It is well known that an α-cyanoacrylate represented by the general formula

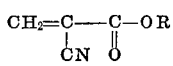

wherein R is a $C_1$–$C_{16}$ alkyl group, a cyclohexyl group or a phenyl group, has such a property that when formed into a thin film, it is anionically polymerized, without any particular addition of catalyst, in such a short period of time as several seconds to several minutes due to a slight amount of moisture present in the air, and that when used as an adhesive, it can provide an adhering power extremely high in strength. By virtue of the above-mentioned characteristic, the α-cyanoacrylates are used, as one-liquid type instantaneous adhesives, for the bonding of substantially all of organic and inorganic substances, such as rubbers, plastics, metals, fibers, leathers, etc.; for the bonding of parts of electric appliances, precision instruments and household articles; and further for the bonding of blood vessels in surgical operations. In addition thereto, they have been utilized not as mere adhesives but as fillers for filling small cavities or cracks in the therapy of decayed teeth.

Thus, the α-cyanoacrylates have been advantageously used in various fields. They have, however, such a great drawback that even when stored in tightly closed vessels in a state shielded from moisture in the air, they polymerize within a relatively short period of time, if they are allowed to stand at normal temperature, and said period of time becomes shorter with increasing storage temperature.

In storing the α-cyanoacrylates, therefore, they are made high in stability by using an anionic polymerization inhibitor in the form of an acid gas, such as sulfite gas, nitrogen dioxide or hydrogen fluoride, in combination with a free radical polymerization inhibitor such as hydroquinone, tert-butyl catechol or monomethyl ether of hydroquinone (refer to U.S. Pats. 2,794,788 and 2,765,332).

As mentioned above, however, the anionic polymerization inhibitor, which is a main component of the conventional stabilizer, is gaseous at normal temperature. Accordingly, in adding a definite amount of the inhibitor to the α-cyanoacrylate, a part thereof escapes without being dissolved, and therefore the inhibitor is difficultly added in an accurate amount. Moreover, when an inhibitor-incorporated α-cyanoacrylate is stored for a long period of time or is stored while using the same intermittently, there are even such cases where the inhibitor spontaneously escapes from the monomer. Thus, it is difficult to impart complete stability to α-cyanoacrylates.

DISCLOSURE OF THE INVENTION

The present invention has been established in order to cope with such circumstances as mentioned above.

The first object of the present invention is to provide an α-cyanoacrylate composition containing a stabilizer, which can be accurately added to the α-cyanoacrylate, scarcely escapes during storage, and can thoroughly stabilize the α-cyanoacrylate.

The second object of the invention is to provide an α-cyanoacrylate composition increased in tackiness which is stable and is less in length.

The first object of the invention can be accomplished by adding a solid aromatic sulfonic acid to an α-cyanoacrylate.

Aromatic sulfonic acids are less volatile than the conventionally employed $SO_2$ stabilizers, so that they do not vary in stabilizing effect over a long period of time. Further, they are highly quantitative at the time of addition, and hence can maintain the uniformity in quality of the resulting mixtures. Accordingly, an α-cyanoacrylate incorporated with a suitable amount of the aromatic sulfonic acid shows favorable storage stability even at an elevated temperature and does not polymerize over an extremely long period of time at room temperature, which is an ordinary storage temperature. When brought into the form of a thin film, however, said α-cyanoacrylate instantaneously polymerizes without application of heat or pressure or without addition of any polymerization catalyst, as in the case of an α-cyanoacrylate incorporated with no aromatic sulfonic acid, and the bonding strength attained is sufficiently high when viewed from the practical standpoint.

Examples of the aromatic sulfonic acid employed in the present invention include benzenesulfonic acid [$C_6H_5SO_3H$], p-toluenesulfonic acid [$CH_3 \cdot C_6H_4SO_3H$], p-xylene-2-sulfonic acid [$(CH_3)_2C_6H_3SO_3H$], p-phenolsulfonic acid [$C_6H_4(OH) \cdot SO_3H$], 1-naphthalenesulfonic acid [$C_{10}H_7SO_3H$] and p-nitrobenzenesulfonic acid [$C_6H_4(NO_2) \cdot SO_3H$]. The amounts of these aromatic sulfonic acids to be added to α-cyanoacrylates are within the range of 0.0001 to 0.01% by weight. Practically, however, the amounts within the range of 0.001 to 0.003% by weight are preferable. If the amounts thereof are less than said range, no sufficient storage stability is displayed, while if the amounts are more than said range, a relatively long period of time is required at the time of initial bonding, or the lowering of bonding strength is brought about. An α-cyanoacrylate incorporated with the aromatic sulfonic acid has sufficient storage stability for practical purposes, even when it is used independently, but may further be incorporated with 0.005 to 0.5% by weight (based on the monomer) of a known radical polymerization inhibitor such as hydroquinone or monomethyl ether of hydroquinone.

Examples of α-cyanoacrylates capable of being stabilized in accordance with the present invention include α-cyanomethyl acrylate, α-cyanoethyl acrylate, α-cyano-n-propyl acrylate, α-cyanoisopropyl acrylate, α-cyanobutyl acrylate, α-cyanoisobutyl acrylate, α-cyanoamyl acrylate, α-cyanocyclohexyl acrylate, α-cyanolauryl acrylate, α-cyanocapryl acrylate and α-cyano-2-ethylhexyl acrylate.

Now, the second object of the present invention is explained below.

α-Cyanoacrylate is a substance which is extremely high in permeability. Accordingly, in applying the α-cyanoacrylate to a porous material, e.g. paper, leather, wood or cloth, it has heretofore been incorporated with such a viscosity-increasing agent as, for example, an α-cyanoalkyl acrylate polymer, an acrylate ester polymer, a cellulose ester or the like. The present inventors have found, however, that acrylate ester-acrylonitrile copolymers are particularly excellent as compared with the conventional viscosity-increasing agents. That is, the above-mentioned copolymers have such advantages that when added to α-cyanoacrylates, they provide favorable stability and viscosity, are less in length, and give plasticity to α-cyanoacrylate polymers after curing to make them less brittle than conventional polymers of this kind. Among the said copolymers, those containing an acrylate ester whose alkyl group has 4 or more carbon atoms are low in solubility for α-cyanoacrylates. It is therefore preferable to use copolymers containing an acrylate ester whose alkyl group has 1 to 4 carbon atoms. Examples of such acrylate ester include methyl acrylate, ethyl acrylate, propyl acrylate, isopropyl acrylate, butyl acrylate and isobutyl acrylate.

The composition ratio of the acrylate ester-acrylonitrile copolymer is preferably such that the proportion of the acrylate ester in the copolymer is 60–90% by weight based on 100% by weight of the copolymer. Although the adoption of an acrylate ester proportion out of said range is not objectionable, difficulties in solubility and hardness are brought about with increasing proportion of the acrylonitrile component.

The solution viscosity of the copolymer is preferably about 2 to 4 when represented by $\eta_{sp/c}$ (where $c$ is the amount (g.) of the copolymer in 100 cc. of an acetone solution thereof). $\eta_{sp}$ is measured in the following manner: 0.2 g. of the copolymer is accurately weighed into a 100 cc. messflask and is dissolved in acetone to make 100 cc. This solution and acetone itself are subjected individually to a Ubbelohde's viscometer (or an Ostwald's viscometer) and are measured 3 times or more in flow-down time (sec.) at 30° C., and the average values of the solution and the acetone are represented by $t$ and $t_0$, respectively. Using these values, the viscosity of the copolymer is calculated according to the following equation.

$$\eta_{sp} = \frac{t}{t_0} - 1$$

DESCRIPTION OF THE PREFERRED EMBODIMENTS

The present invention is illustrated below with reference to examples and comparative examples.

Examples 1–50 and Comparative Examples 1–4

To an α-cyanoethyl acrylate monomer were individually added such aromatic sulfonic acids as benzenesulfonic acid, p-toluenesulfonic acid, p-phenolsulfonic acid and p-nitrobenzenesulfonic acid, either independently or in combination with monomethyl ether of hydroquinone (hereinafter abbreviated as "MEHQ"), to prepare samples. For comparison, control samples which had not been incorporated with aromatic sulfonic acids were prepared. These samples and control samples were investigated in storage stability and bonding strength to obtain the results set forth in Tables 1 and 2.

The storage stability was tested by charging 15 g. of each sample in a 20 ml. polyethylene-made vessel, tightly closing the vessel as it was without substituting the air present in the upper space of the vessel by an inert gas or the like, and then allowing the vessel to stand at room temperature or in a thermostat. The test in thermostat was effected at 60° C. in order to confirm that the samples of the present invention are stable even at elevated temperatures.

The bonding strength was measured in such a manner that a definite amount (0.005 g.) of each sample immediately before storage or during storage was applied onto the cross-section of a rigid polyvinyl chloride test piece of 5 mm. in thickness, 20 mm. in width and 35 mm. in length (application area 10 cm.[2]), and the test piece was bonded at said cross-section, with rubbing, to another test piece of the same quality and, after a definite period of time (24 hours), was measured in tensile strength by use of an Amsler-type tensile testing machine.

TABLE 1

| | Stabilizer | | Amount of MEHQ added (wt. percent) | Temperature (° C.) | Stable period |
|---|---|---|---|---|---|
| | Kind | Amount added (wt. percent) | | | |
| Comparative Example: | | | | | |
| 1 | No addition | 0 | 0 | (1) | 5 days. |
| 2 | do | 0 | 0 | 60 | 1 day. |
| 3 | do | 0 | 0.005 | 60 | 1 day. |
| Example: | | | | | |
| 1 | Benzenesulfonic acid | 0.001 | 0.005 | (1) | More than 3 months |
| 2 | do | 0.001 | 0.005 | 60 | More than 30 days. |
| 3 | do | 0.001 | 0.005 | 60 | Do. |
| 4 | do | 0.002 | 0 | (1) | More than 6 months. |
| 5 | do | 0.002 | 0 | 60 | More than 30 days. |
| 6 | do | 0.002 | 0 | 60 | Do. |
| 7 | do | 0.003 | 0.005 | (1) | More than 6 months. |
| 8 | do | 0.003 | 0.005 | 60 | More than 30 days. |
| 9 | do | 0.003 | 0.005 | 60 | Do. |
| 10 | do | 0.004 | 0 | (1) | More than 6 months. |
| 11 | do | 0.004 | 0 | 60 | More than 30 days. |
| 12 | do | 0.004 | 0 | 60 | Do. |
| 13 | do | 0.005 | 0 | (1) | More than 6 months. |
| 14 | do | 0.005 | 0 | 60 | More than 30 days. |
| 15 | do | 0.005 | 0 | 60 | Do. |
| 16 | p-Toluenesulfonic acid | 0.001 | 0.01 | (1) | More than 3 months. |
| 17 | do | 0.001 | 0.01 | 60 | More than 30 days. |
| 18 | do | 0.001 | 0.01 | 60 | Do. |
| 19 | do | 0.002 | 0 | (1) | More than 6 months. |
| 20 | do | 0.002 | 0 | 60 | More than 30 days. |
| 21 | do | 0.002 | 0 | 60 | Do. |
| 22 | do | 0.003 | 0 | (1) | More than 6 month ; |
| 23 | do | 0.003 | 0 | 60 | More than 30 days. |
| 24 | do | 0.003 | 0 | 60 | Do. |
| 25 | p-Phenolsulfonic acid | 0.001 | 0 | (1) | More than 3 months ; |
| 26 | do | 0.001 | 0 | 60 | More than 30 days. |
| 27 | do | 0.001 | 0 | 60 | Do. |
| 28 | do | 0.002 | 0.01 | (1) | More than 6 months. |

TABLE 1.—Continued

| Kind | Stabilizer Amount added (wt. percent) | Amount of MEHQ added (wt. percent) | Temperature (° C.) | Stable period |
|---|---|---|---|---|
| Example: | | | | |
| 29 ............ p-Phenolsulphonic acid ............ | 0.002 | 0.01 | 60 | More than 30 days. |
| 30 ............ do ............ | 0.002 | 0.01 | 60 | Do. |
| 31 ............ do ............ | 0.003 | 0 | (¹) | More than 6 months. |
| 32 ............ do ............ | 0.003 | 0 | 60 | More than 30 days. |
| 33 ............ do ............ | 0.003 | 0 | 60 | Do. |
| 34 ............ p-Nitrobenzenesulfonic acid ............ | 0.001 | 0.005 | (¹) | More than 6 months. |
| 35 ............ do ............ | 0.001 | 0.005 | 60 | More than 30 days. |
| 36 ............ do ............ | 0.001 | 0.005 | 60 | Do. |
| 37 ............ do ............ | 0.002 | 0 | (¹) | More than 6 months. |
| 38 ............ do ............ | 0.002 | 0 | 60 | More than 30 days. |
| 39 ............ do ............ | 0.002 | 0 | 60 | Do. |
| 40 ............ do ............ | 0.003 | 0 | (¹) | More than 6 months. |
| 41 ............ do ............ | 0.003 | 0 | 60 | More than 30 days. |
| 42 ............ do ............ | 0.003 | 0 | 60 | Do. |

¹ Room temperature.

TABLE 2

| Kind | Stabilizer Amount added (wt. percent) | Amount of MEHQ added (wt. percent) | Temperature (° C.) | Tensile strength (kg./cm.²) 0 days | 10 days | 20 days | 30 days | 2 months | 3 months | 6 months |
|---|---|---|---|---|---|---|---|---|---|---|
| Comparative Example: No addition 4. | 0 | 0 | 60 | 356 | (¹) | | | | | |
|  | 0 | 0 | 40 | 356 | (¹) | | | | | |
|  | 0 | 0 | 20 | 356 | (¹) | | | | | |
| Example: | | | | | | | | | | |
| 43 ........ Benzenesulfonic acid ........ | 0.002 | 0 | 60 | 352 | 346 | 318 | 280 | | | |
|  | 0.002 | 0 | 40 | 352 | 351 | 346 | 342 | 335 | 294 | |
|  | 0.002 | 0 | 20 | 352 | 348 | 347 | 345 | 340 | 327 | 257 |
| 44 ........ do ........ | 0.003 | 0.005 | 60 | 347 | 337 | 326 | 300 | | | |
|  | 0.003 | 0.005 | 40 | 347 | 341 | 342 | 335 | 327 | 304 | |
|  | 0.003 | 0.005 | 20 | 347 | 350 | 351 | 342 | 340 | 321 | 260 |
| 45 ........ p-Toluenesulfonic acid ........ | 0.002 | 0 | 60 | 350 | 339 | 310 | 275 | | | |
|  | 0.002 | 0 | 40 | 350 | 342 | 335 | 316 | 320 | 286 | |
|  | 0.002 | 0 | 20 | 350 | 351 | 347 | 341 | 336 | 326 | 252 |
| 46 ........ do ........ | 0.003 | 0 | 60 | 345 | 328 | 315 | 264 | | | |
|  | 0.003 | 0 | 40 | 345 | 352 | 336 | 328 | 317 | 295 | |
|  | 0.003 | 0 | 20 | 345 | 350 | 345 | 342 | 341 | 330 | 248 |
| 47 ........ p-Phenolsulfonic acid ........ | 0.002 | 0.01 | 60 | 355 | 330 | 317 | 284 | | | |
|  | 0.002 | 0.01 | 40 | 355 | 345 | 333 | 316 | 310 | 279 | |
|  | 0.002 | 0.01 | 20 | 355 | 352 | 346 | 335 | 331 | 324 | 255 |
| 48 ........ do ........ | 0.004 | 0 | 60 | 328 | 326 | 323 | 276 | | | |
|  | 0.004 | 0 | 40 | 328 | 340 | 342 | 321 | 313 | 290 | |
|  | 0.004 | 0 | 20 | 328 | 353 | 348 | 340 | 338 | 323 | 231 |
| 49 ........ p-Nitrobenzenesulfonic acid ........ | 0.001 | 0 | 60 | 356 | 327 | 320 | 256 | | | |
|  | 0.001 | 0 | 40 | 356 | 338 | 329 | 319 | 311 | 303 | |
|  | 0.001 | 0 | 20 | 356 | 340 | 342 | 347 | 326 | 312 | 256 |
| 50 ........ do ........ | 0.003 | 0 | 60 | 344 | 330 | 312 | 263 | | | |
|  | 0.003 | 0 | 40 | 344 | 337 | 321 | 321 | 319 | 294 | |
|  | 0.003 | 0 | 20 | 344 | 348 | 334 | 350 | 342 | 327 | 242 |

¹ Polymerized.

The term "polymerized" appearing in the column "tensile strength" in Table 2 indicates that when the sample was taken out on the 10th day from the initiation of storage at, for example, 60° C., as in the case of Comparative Example 4, the sample had already polymerized and was not usable.

As is clear from Tables 1 and 2, α-cyanoacrylates stabilized in accordance with the present invention are markedly excellent in storage stability.

Examples 51–68 and Comparative Examples 5–38

α-Cyanoacrylate compositions comprising each monomer, a viscosity-increasing agent and 0.006% by weight of p-toluenesulfonic acid as a stabilizer were investigated in solubility, viscosity, length, coloration and bonding strength to obtain the results set forth in Tables 3 and 4. Further, the said compositions were investigated in relationship between the solubilities of the compositions and the proportions and compositions of the acrylate ester-acrylonitrile copolymers employed, to obtain the results shown in Table 5.

The solubility of each composition was measured in such a manner that the viscosity-increasing agent, which had been finely divided into a definite size, was added to each α-cyanoacrylate monomer, and the dissolved state of the mixture, after shaking at room temperature for 24 hours, was evaluated by visual observation. The viscosity was decided in such a manner that the tackiness of each composition after dissolution of the viscosity-increasing agent was visually evaluated or was measured by means of a Brookfield viscometer. The length was evaluated by dipping the tip of a glass rod in the composition after dissolution of the viscosity-increasing agent and taking up the glass rod to visually observe the state of the composition on the tip of the glass rod. The coloraion was evaluated by the visual observation of the color tone of the composition after dissolution of the viscosity-increasing agent. The stability was tested in such a manner that 15 g. of each composition was charged into a 20 ml. polyethylene-made vessel, and the vessel was tightly closed and then allowed to stand at room temperature or in a thermostat at 60° C. and at a relative humidity (RH) of 55%. The tensile strength was measured in such a manner that a drop of the composition was applied to the cross-section of a rigid polyvinyl chloride test piece of 20 mm. in width, 35 mm. in length and 5 mm. in thickness, was closely adhered, with rubbing, to another test piece of the same quality, was allowed to stand at room temperature for 24 hours and was then subjected to an Amsler-type tensile testing machine. The impact strength was measured by impacting with a U–F type impact testing machine the bonded portion of two rigid polyvinyl chloride test pieces which had been bonded to each other in the same manner as mentioned above. Further, the solution viscosity ($\eta_{sp/c}$) of the acrylate ester-acrylonitrile copolymer employed in each example was 3.0–3.5.

TABLE 3

| | Monomer | Viscosity-increasing agent (polymer) Kind | Amount added (wt. percent) | Solubility | Viscosity | Length | Coloration | Stable period Room temperature | 60° C./55% RH |
|---|---|---|---|---|---|---|---|---|---|
| Example No.: | | | | | | | | | |
| 51 | Ethyl α-cyanoacrylate | Methyl acrylate/acrylonitrile, 80/20 | 2 | O | O | O | O | More than 6 months | More than 1 month |
| 52 | do | Ethyl acrylate/acrylonitrile, 75/25 | 2 | O | O | O | O | do | Do. |
| 53 | do | Butyl acrylate/acrylonitrile, 70/30 | 2 | O | O | O | O | do | Do. |
| Comparative Example No.: | | | | | | | | | |
| 5 | Ethyl α-cyanoacrylate | Nitrile rubber | 2 | O | △ | O | △ | 1 month | 8 days |
| 6 | do | Cellulose acetate | 2 | △ | | | | | |
| 7 | do | Cellulose propionate | 2 | O | △ | O | O | 3 months | 21 days |
| 8 | do | Methyl acrylate | 2 | O | O | X | O | More than 6 months | More than 1 month |
| 9 | do | Ethyl acrylate | 2 | O | O | X | O | do | Do. |
| 10 | do | Butyl acrylate | 2 | O | O | X | O | do | Do. |
| 11 | do | 2-ethylhexyl acrylate | 2 | X | | | | | |
| 12 | do | Methyl methacrylate (high polymerization degree) | 2 | O | O | X | O | do | Do. |
| 13 | do | Methyl methacrylate (low polymerization degree) | 2 | O | △ | O | O | do | Do. |
| 14 | do | Ethyl α-cyanoacrylate | 2 | O | O | X | O | do | Do. |
| 15 | do | Butyl α-cyanoacrylate | 2 | O | O | X | O | do | Do. |
| 16 | do | Styrol | 2 | △ | | | | | |
| 17 | do | Vinyl acetate/vinyl chloride | 2 | O | △ | O | O | More than 6 months | Do. |
| 18 | do | Methyl methacrylate/butadiene/styrol | 2 | △ | | | | | |
| 19 | do | Acrylonitrile/butadiene/styrol | 2 | O | △ | △ | △ | | |

NOTE.—Mark O represents favorable; Mark △ represents somewhat favorable; Mark X represents poor.

TABLE 4

| | Monomer | Viscosity-increasing agent (polymer) Kind | Amount added (wt. percent) | Viscosity (cp.) | Bonding strength Tensile (kg./cm.²) | Impact (kg. cm./cm.²) |
|---|---|---|---|---|---|---|
| Example No.: | | | | | | |
| 54 | Ethyl α-cyanoacrylate | Methyl acrylate/acrylonitrile, 80/20 | 2.1 | 92 | 351 | 16.2 |
| 55 | do | Ethyl acrylate/acrylonitrile, 75/25 | 2.0 | 102 | 348 | 16.5 |
| 56 | do | Butyl acrylate/acrylonitrile, 70/30 | 1.8 | 97 | 355 | 17.3 |
| 57 | Butyl α-cyanoacrylate | Methyl acrylate/acrylonitrile, 80/20 | 2.1 | 91 | 219 | 10.8 |
| 58 | do | Ethyl acrylate/acrylonitrile, 75/25 | 2.0 | 98 | 218 | 11.1 |
| 59 | do | Butyl acrylate/acrylonitrile, 70/30 | 1.8 | 96 | 223 | 12.1 |
| Comparative Example No.: | | | | | | |
| 20 | Ethyl α-cyanoacrylate | Cellulose propionate | 4.6 | 108 | 319 | 13.7 |
| 21 | do | Ethyl acrylate | 4.8 | 104 | 324 | 14.1 |
| 22 | do | Butyl acrylate | 4.5 | 94 | 318 | 13.6 |
| 23 | do | Methyl methacrylate | 5.1 | 105 | 305 | 13.2 |
| 24 | do | Butyl α-cyanoacrylate | 4.8 | 112 | 323 | 14.0 |
| 25 | Butyl α-cyanoacrylate | Cellulose propionate | 4.6 | 106 | 188 | 8.9 |
| 26 | do | Ethyl acrylate | 4.8 | 103 | 176 | 9.2 |
| 27 | do | Butyl acrylate | 4.5 | 96 | 180 | 8.6 |
| 28 | do | Methyl methacrylate | 5.1 | 104 | 182 | 8.8 |
| 29 | do | Butyl α-cyanoacrylate | 4.8 | 101 | 178 | 8.7 |

TABLE 5

| | Monomer | Stabilizer Kind | Amount added (wt. percent) | Viscosity-increasing agent (polymer) Kind | Ratio | Amount added (wt. percent) | Solubility |
|---|---|---|---|---|---|---|---|
| Example No.: | | | | | | | |
| 60 | Ethyl α-cyanoacrylate | p-Toluenesulfonic acid | 60 | Methyl acrylate/acrylonitrile | 60~90/40~10 | 2.1 | Favorable. |
| 61 | do | do | 60 | Ethyl acrylate/acrylonitrile | 60~90/40~10 | 2.0 | Do. |
| 62 | do | do | 60 | Butyl acrylate/acrylonitrile | 60~90/40~10 | 1.8 | Do. |
| 63 | Propyl α-cyanoacrylate | Benzenesulfonic acid | 60 | Methyl acrylate/acrylonitrile | 60~90/40~10 | 2.0 | Do. |
| 64 | do | do | 60 | Ethyl acrylate/acrylonitrile | 60~90/40~10 | 2.0 | Do. |
| 65 | do | do | 60 | Butyl acrylate/acrylonitrile | 60~90/40~10 | 2.0 | Do. |
| 66 | Butyl α-cyanoacrylate | o-Nitrobenzenesulfonic acid | 60 | Methyl acrylate/acrylonitrile | 60~90/40~10 | 2.0 | Do. |
| 67 | do | do | 60 | Ethyl acrylate/acrylonitrile | 60~90/40~10 | 2.0 | Do. |
| 68 | do | do | 60 | Butyl acrylate/acrylonitrile | 60~90/40~10 | 2.0 | Do. |

TABLE 5.—Continued

| | Monomer | Stabilizer | | Viscosity-increasing agent (polymer) | | | Solubility |
|---|---|---|---|---|---|---|---|
| | | Kind | Amount added (wt. percent) | Kind | Ratio | Amount added (wt. percent) | |
| Example No.: | | | | | | | |
| 30 | Ethyl α-cyanoacrylate | p-Toluene-sulfonic acid | 60 | Methyl acrylate/acrylonitrile | 10~50/90~50 | 2.0 | Somewhat poor. |
| 31 | do | do | 60 | Ethyl acrylate/acrylonitrile | 10~50/90~50 | 2.0 | Do. |
| 32 | do | do | 60 | Butyl acrylate/acrylonitrile | 10~50/90~50 | 2.0 | Do. |
| Comparative Example No.: | | | | | | | |
| 33 | Butyl α-cyanoacrylate | Benzenesulfonic acid | 60 | Methyl acrylate/acrylonitrile | 10~50/90~50 | 2.0 | Somewhat poor. |
| 34 | do | do | 60 | Ethyl acrylate/acrylonitrile | 10~50/90~50 | 2.0 | Do. |
| 35 | do | do | 60 | Butyl acrylate/acrylonitrile | 10~50/90~50 | 2.0 | Do. |
| 36 | Methyl α-cyanoacrylate | p-Toluene sulfonic acid | 60 | 2-ethylhexyl acrylate/acrylonitrile | 10~90/90~10 | 2.0 | Somewhat poor. |
| 37 | Ethyl α-cyanoacrylate | do | 60 | | | 2.0 | Do. |
| 38 | Butyl α-cyanoacrylate | do | 60 | | | 2.0 | Do. |

While the above has been described in connection with preferred embodiments of this invention, it will be obvious to those skilled in the art that various changes and modifications may be made therein without departing from the invention and it is aimed, therefore, to cover in the appended claims all such changes and modifications as falling within the true spirit and scope of this invention.

What is claimed is:

1. A stable adhesive composition consisting essentially of monomeric ester of α-cyanoacrylic acid having the formula

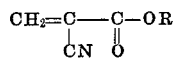

wherein R is a member selected from the group consisting of an alkyl group having 1 to 16 carbon atoms, a cyclohexyl group and a phenyl group, and as a stabilizer from about 0.0001% to about 0.01% by weight of an aromatic sulfonic acid based on the weight of said monomeric ester, said aromatic sulfonic acid being selected from the group consisting of benzene sulfonic acid, p-toluene sulfonic acid, p-phenyl sulfonic acid and p-nitrobenzene sulfonic acid.

2. A composition according to claim 1, wherein said composition contains 0.001 to 0.003% by weight of said aromatic sulfonic acid stabilizer.

3. A composition according to claim 1, wherein the aromatic sulfonic acid is benzenesulfonic acid.

4. A composition according to claim 1, wherein the aromatic sulfonic acid is p-toluenesulfonic acid.

5. A composition according to claim 1, wherein the aromatic sulfonic acid is p-phenolsulfonic acid.

6. A composition according to claim 1, wherein the aromatic sulfonic acid is p-nitrobenzenesulfonic acid.

7. A composition according to claim 1, further comprising 0.005 to 0.5% by weight, based on said monomeric ester, of a radical polymerization inhibitor selected from the group consisting of hydroquinone and monomethyl ether of hydroquinone.

References Cited
UNITED STATES PATENTS 2,721,858  10/1955  Joyner et al. _____ 260—465.4 X
3,355,482  11/1967  Coover, Jr. et al. __ 260—465.4 X JOSEPH P. BRUST, Primary Examiner U.S. Cl. X.R.

260—85.5, 88.7, 465 D, 465.4